March 5, 1963

N. J. SMITH 3,079,721

LURE LIGHT

Filed July 24, 1961

INVENTOR
NEWMAN J. SMITH

BY Hurvitz and Rose

ATTORNEYS

March 5, 1963

N. J. SMITH 3,079,721

LURE LIGHT

Filed July 24, 1961

INVENTOR
*NEWMAN J. SMITH*

BY *Hurvitz and Rose*

ATTORNEYS

# United States Patent Office 3,079,721
Patented Mar. 5, 1963

3,079,721
LURE LIGHT
Newman J. Smith, Columbia, S.C., assignor of one-half to Jack Diamond, Washington, D.C.
Filed July 24, 1961, Ser. No. 126,330
1 Claim. (Cl. 43—17.5)

The present invention relates generally to illuminated fishing lures employing live bait, and more particularly to a fishing lure including a water tight lamp unit, to which is detachably secured a transparent enclosure for live bait, the enclosure being fully illuminated by the lamp and having openings to permit circulation of fresh water.

It is well known that many types of sea animals are attracted to light, from a great distance. Small swimming creatures such as minnows or shrimp are commonly used as live bait, by confining them in a lighted area, to attract larger fish. An example of a fishing lure using minnows as live bait is shown in the patent to L. K. Bair, 2,898,698, issued on August 11, 1959.

The present invention is an improvement for use in fishing lures, having a simple and unique construction which enables the confinement in a transparent receptacle of only those swimming creatures which are to serve as live bait and excluding fish of a size larger than the live bait.

An object and feature of the present invention is an improved fishing lure which includes a lamp housing unit of general utility, which may function also to illuminate a transparent receptacle for confining live bait.

Another object and feature of the invention resides in constructional features of a transparent receptacle in a fishing lure, which enables the continuous replenishment of water for live bait confined in the receptacle.

Yet another object and feature of the invention is the provision of a transparent receptacle in a fishing lure, which, when lifted out of water, retains sufficient water therein to support the lives of the live bait therein.

The above and still further objects, features and advantages of the present invention will become apparent upon consideration of the following detailed description of one specific embodiment thereof, especially when taken in conjunction with the accompanying drawings, wherein.

Figure 1:
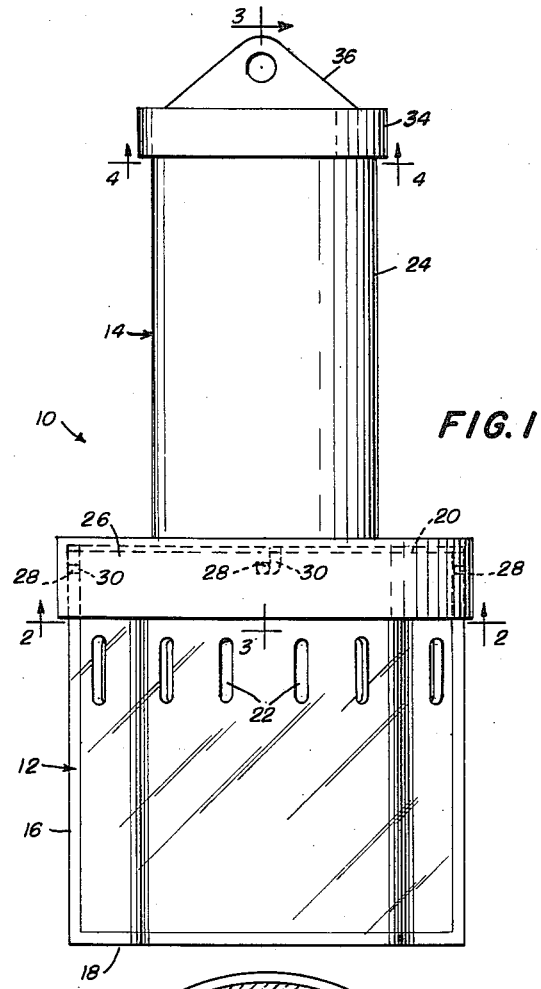
FIGURE 1 is a view in elevation of a fishing lure according to the invention.
Figure 2:
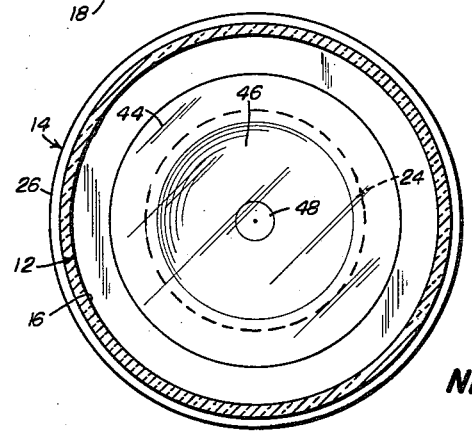
FIGURE 2 is a sectional view of the fishing lure of FIGURE 1 taken on line 2—2.

Employing the same reference numerals for like parts throughout the drawings, and referring to FIGURES 1 and 2, a fishing lure is shown at 10 and includes a transparent receptacle 12 made of a hard, transparent plastic or glass and a lamp unit 14. The transparent receptacle 12 may be of any suitable shape and is shown preferably in the form of a tube having a wall 16 closed at its lower end 18 and open at its upper end 20. The receptacle 12 has a plurality of spaced holes 22 in wall 16 near the upper end 20 thereof to enable the free passage of water into and out of the receptacle. The holes 22 are sufficiently small in size to prevent creatures used as live bait from passing therethrough.

The lamp unit 14 has a housing 24 made of hard watertight material such as hard plastic or rubber, and the material also has the property of being an electrical insulator. A socket 26 is integrally mounted at the lower end of housing 24 and is flanged outwardly therefrom for receiving transparent receptacle 12. Lugs 28 are mounted on the inside of socket 26. Receptacle 12 is provided with angled recesses 30 which cooperate with lugs 28 of the socket to secure the receptacle into the socket by insertion and rotation in a well known manner.

Figure 3:
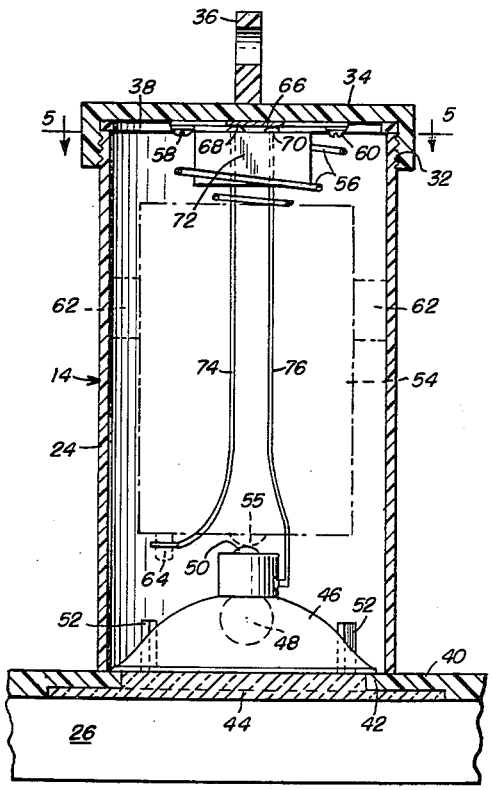
FIGURE 3 is a longitudinal section of the fishing lure of FIGURE 1 along lines 3—3 of FIGURE 1.
Figure 4:
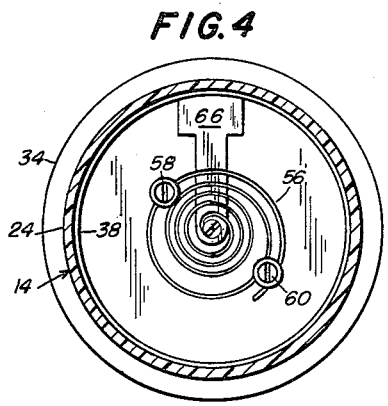
FIGURES 4 and 5 are views in sections of the fishing lure of FIGURE 3.
Figure 5:
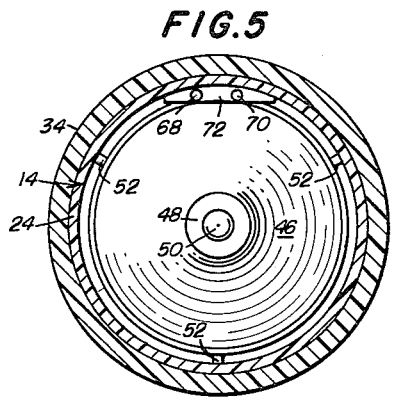

Referring to FIGURES 3, 4 and 5, the housing 24 is also provided with a screw thread 32 at its upper end to receive a cap 34 of the rotating screw type. Integral with cap 34 is a ring member 36 for receiving a supporting line. The inside periphery of cap 34 has a gasket 38 so that when cap 34 is rotated into housing 24, a watertight fit is provided therewith in a well known manner.

Socket 26 is flanged outwardly from housing 24. A flange portion of socket 26 is indicated at 40 and extends inwardly of the walls of housing 24 to form a shoulder 42 therein. Bonded or welded to the faces of shoulder 42 is a transparent member 44 preferably of hard plastic, which forms a water tight joint therewith. Also secured to the shoulder 42, preferably by bonding or welding, is a reflector 46. A lamp 48 of conventional construction is supported by the reflector 46. Lamp 48 has a contact 50 at its base. Reflector 46 may be suitably located in housing 24 by spacers 52 mounted at intervals on the inside of the housing 24 as shown in FIGURE 5. A 6 volt D.C. battery 54 is supported at its positive terminal 55 by the base of the lamp 48. To support the battery 54 at its other end, cap 34 is provided with a tapered compression spring 56 of conventional design secured to the cap by screws 58 and 60. Additional spacers 62 mounted inside the housing 24 may be provided for tight fit of the battery 54.

The electrical circuit for lamp 48 will now be explained in conjunction with FIGURES 3, 4, 5 and 7. D.C. battery 54 is provided with a negative terminal at 64. The cap 34 has a contact switch 66 in the underside thereof as shown in FIGURE 4. As best seen in FIGURE 5 housing 24 has a pair of spaced contacts 68 and 70 on an insulated base 72 mounted in the inside periphery of housing 24. Contact 68 is connected to negative terminal 64 by lead 74, and contact 70 is connected to the base of lamp 48 by a lead 76. The above connections and contacts form an electrical circuit as shown in the schematic diagram of FIGURE 7, the reference numerals therein referring to the same elements as in FIGURES 3, 4 and 5. When cap 34 is rotated so that it is fully tightened in threads 32 of housing 24, contact switch 66 covers contacts 68 and 70 to form an electrical current conduction path therebetween, thus closing the circuit as indicated in dotted lines in FIGURE 7. When the circuit is closed, current flows from the battery 54 through contacts 55 and 50 through the filament in lamp 48 to the base of the lamp and through lead 76, contact 70, contact switch 66, contact 68, and lead 74 to the negative terminal 64 of the battery.

Figure 6:
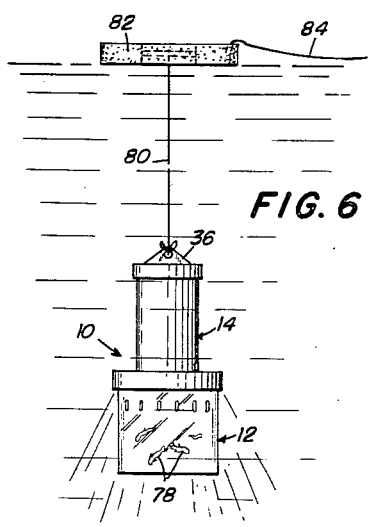
FIGURE 6 is an illustration of the fishing lure according to the invention when in use.
Figure 7:
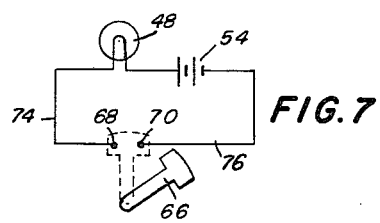
FIGURE 7 is a schematic circuit diagram of a lamp circuit for the fishing lures.

Referring to FIGURE 6, the fishing lure 10 according to the invention is shown when in use to assist in the catching of fish. Live bait such as minnows 78 are shown inside the transparent receptacle 12. A line 80 from a cork 82 floating on the water surface is provided to suspend fishing lure 10 at a suitable depth. An adjusting line 84 attached to cork 82 is provided so that a fisherman may adjust or hold the fishing lure 10 in a suitable position relative to a fisherman.

In operation, the transparent receptacle 12 is detached from the lamp unit 14 and is filled with live bait such as minnows. The receptacle 12 is then secured to socket 26 by insertion and rotation. The cap 34 is rotated so that housing 24 is watertight and the lamp 48 is illuminated. The fishing lure 10 is then lowered into the water in a convenient manner by line 80, and if desired a cork 82 with an adjusting line 84 attached thereto may be used to adjust or hold the position of the fishing lure 10.

If desired, instead of using the transparent receptacle, the lamp unit 14 alone may be lowered into the water in the same manner. It will be appreciated that the lamp unit 14 is always oriented in water so that the lamp illuminates an area downwardly and radially outwardly. This is particularly advantageous in that the fish attracted to the light will not observe any background behind the lamp unit.

When the fishing lure 10 is lifted from the water, water is retained in the transparent receptacle below the level of holes 22. Thus the life of the live bait therein may be maintained for a considerable period of time in the transparent receptacle itself.

Having fully described my invention, I claim:

A fishing lure for holding live bait, comprising a transparent receptacle having a longitudinal axis, said receptacle holding the live bait, a water-tight, electrically insulating housing having a longitudinal axis, said housing being removably secured at its lower end to the upper end of said receptacle, the longitudinal axes of said housing and receptacle being aligned when they are secured to each other, said housing including; a light transparent surface at said lower end, a lamp positioned above said transparent surface for illuminating the bait in said receptacle, a reflector for directing light emanating from said lamp into said receptacle, a battery and a switch connected in series circuit with said lamp, a removable, electrically insulating cover at the upper end of said housing, said cover including means for receiving a vertically extending supporting line, said axes being maintained in the vertical plane when said line is connected to said means for receiving the line, the interior of said cover including a first contact of said switch, a second contact of said switch being mounted at the upper end of said housing and being selectively positioned to engage said first contact, said receptacle including a plurality of slots parallel to said axes only at its upper end, said slots being narrower than the cross section of the bait to prevent escape of the bait from the receptacle.

References Cited in the file of this patent

UNITED STATES PATENTS

| | | |
|---|---|---|
| 373,333 | Brosch | Nov. 15, 1887 |
| 2,314,521 | Schwartz | Mar. 23, 1943 |
| 2,898,698 | Bair | Aug. 11, 1959 |
| 2,908,993 | Webb et al. | Oct. 20, 1959 |

FOREIGN PATENTS

| | | |
|---|---|---|
| 29,431 | Great Britain | 1904 |